(12) United States Patent
Peterson

(10) Patent No.: US 10,625,269 B1
(45) Date of Patent: Apr. 21, 2020

(54) BI-DIRECTIONAL ROTATION FEED ROLLER FOR TREE PROCESSING DEVICES

(71) Applicant: Jesse R. Peterson, Menominee, MI (US)

(72) Inventor: Jesse R. Peterson, Menominee, MI (US)

( * ) Notice: Subject to any disclaimer, the term of this patent is extended or adjusted under 35 U.S.C. 154(b) by 329 days.

(21) Appl. No.: 15/801,374

(22) Filed: Nov. 2, 2017

(51) Int. Cl.
| | |
|---|---|
| *A01G 23/08* | (2006.01) |
| *B02C 18/14* | (2006.01) |
| *B02C 18/22* | (2006.01) |
| *B02C 23/02* | (2006.01) |
| *B02C 13/286* | (2006.01) |
| *B02C 13/09* | (2006.01) |
| *B27L 11/02* | (2006.01) |
| *A01G 3/053* | (2006.01) |

(52) U.S. Cl.
CPC ............ *B02C 18/142* (2013.01); *A01G 23/08* (2013.01); *B02C 13/095* (2013.01); *B02C 13/286* (2013.01); *B02C 18/2283* (2013.01); *B02C 23/02* (2013.01); *B27L 11/02* (2013.01); *A01G 3/053* (2013.01); *B02C 2013/28663* (2013.01)

(58) Field of Classification Search
CPC .... A01G 23/08; A01G 23/083; A01G 23/091; A01G 23/093; A01G 23/095; A01G 23/0955; B02C 18/2225; B02C 18/2266; B02C 18/2283; B27L 11/00; B27L 11/02; B27L 1/10; B27L 1/12
See application file for complete search history.

(56) References Cited

U.S. PATENT DOCUMENTS

| | | | |
|---|---|---|---|
| 7,938,154 B2 * | 5/2011 | Quirke | B27B 25/02 144/34.1 |
| 8,567,706 B2 | 10/2013 | Bradley et al. | |
| 2019/0077042 A1 * | 3/2019 | Lepage | B27L 1/045 |

* cited by examiner

*Primary Examiner* — Matthew Katcoff
(74) *Attorney, Agent, or Firm* — Donald J. Ersler

(57) ABSTRACT

A bi-directional rotation feed roller for tree processing devices preferably includes a drive wheel, a drive disc, a plurality of reinforcement rings and a plurality of reinforcement plates. The drive wheel includes a drive cylinder and a plurality of media engagement thumb nails attached to the drive cylinder. The plurality of media engagement thumb nails are preferably arranged in a plurality of rows. A side wall of the plurality of media engagement thumb nails are preferably angularly offset from a lengthwise axis of the drive plate. The drive disc is attached to the drive wheel in substantially a middle of a with thereof. The plurality of reinforcement rings are attached to an inner perimeter of the drive wheel. The plurality of reinforcement plates are attached to an inside perimeter of the drive wheel between the drive disc and one end of the drive wheel.

18 Claims, 3 Drawing Sheets

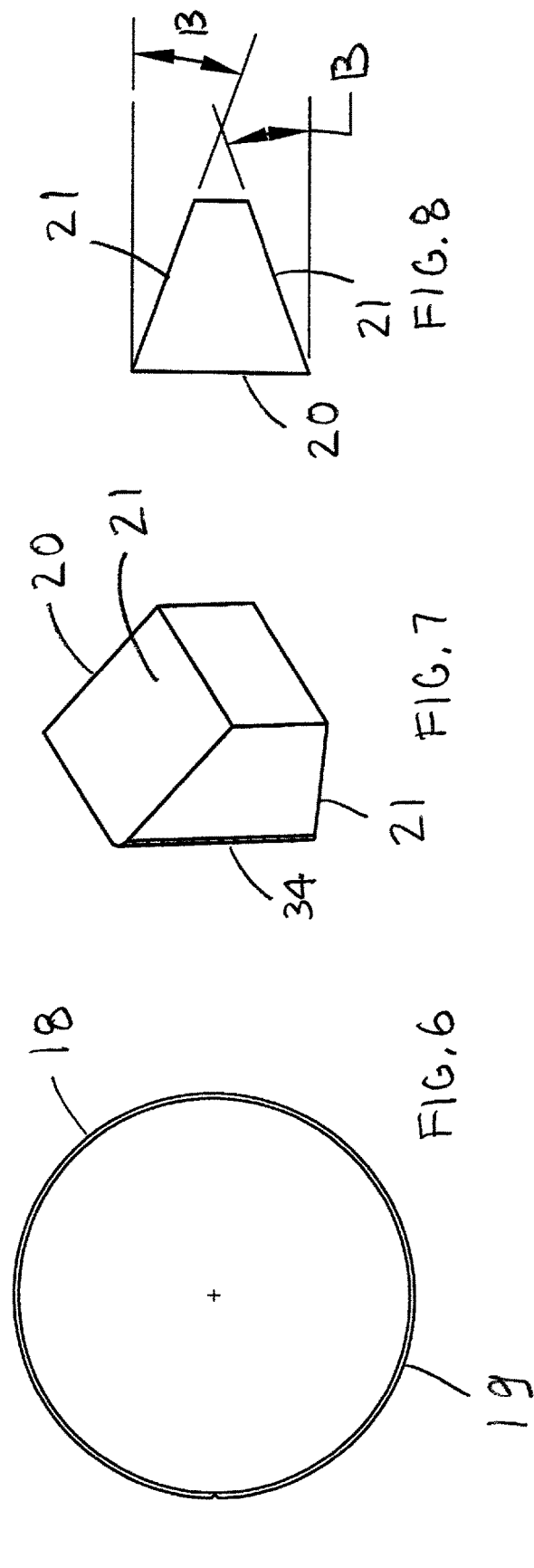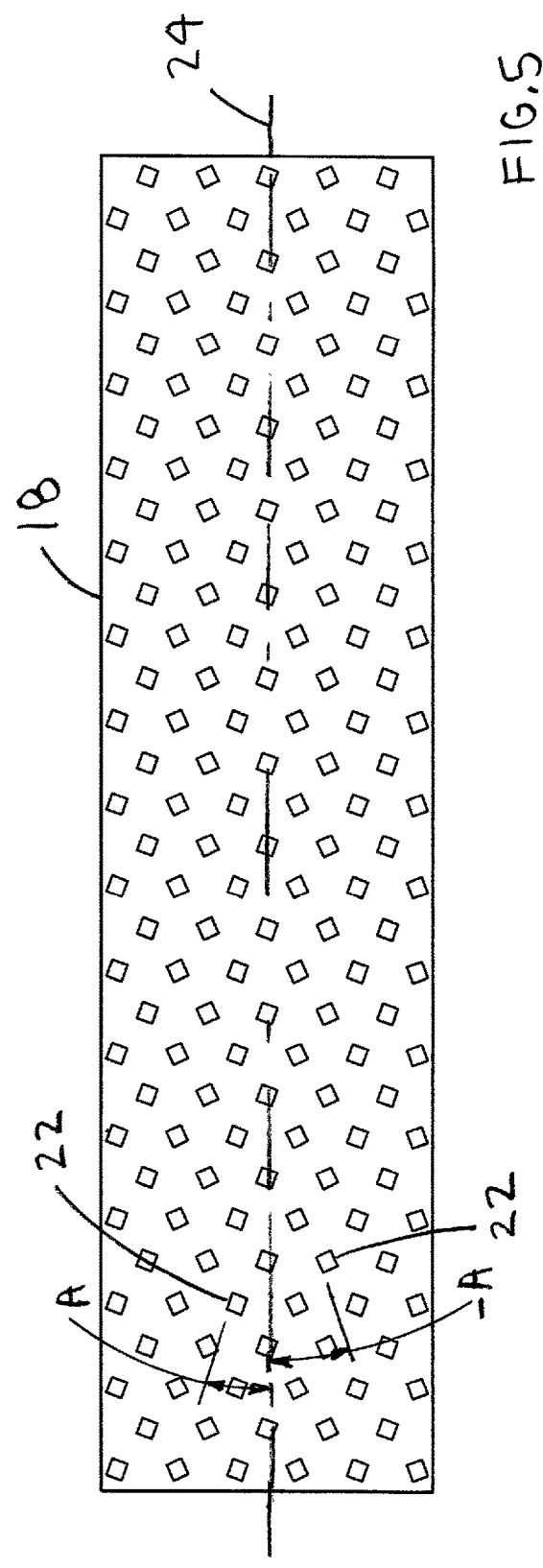

BI-DIRECTIONAL ROTATION FEED ROLLER FOR TREE PROCESSING DEVICES

BACKGROUND OF THE INVENTION

1. Field of the Invention

The present invention relates generally to logging and more specifically to a bi-directional rotation feed roller for tree processing devices, which allows a feed direction of a tree trunk retained between feed rollers in a tree processing device to be reversed.

2. Discussion of the Prior Art

It appears that the prior art does not teach or suggest a bi-directional rotation feed roller for tree processing devices. U.S. Pat. No. 8,567,706 to Bradley et al. discloses a wood chipper feed roller. Bradley et al. discloses slopped claws 50.

Accordingly, there is a clearly felt need in the art for a bi-directional rotation feed roller for tree processing devices, which allows a feed direction of a tree trunk retained between feed rollers in a tree processing device, such as a tree harvester or saw mill to be reversed, and retaining traction and holding properties.

SUMMARY OF THE INVENTION

The present invention provides a bi-directional rotation feed roller for tree processing devices, which allows a feed direction of a tree trunk retained between feed rollers in a tree processing device to be reversed. The bi-directional rotation feed roller for tree processing devices (bi-directional rotation feed roller) preferably includes a drive wheel, a drive disc, a plurality of reinforcement rings and a plurality of reinforcement plates. The drive wheel includes a drive cylinder and a plurality of media engagement thumb nails (drive wedges). The drive cylinder is preferably created from a drive plate bent into a cylindrical shape. A plurality of shallow thumb nail cavities are preferably etched in an outside surface of the drive plate to receive the plurality of media engagement thumb nails. The plurality of thumb nail cavities are preferably arranged in a plurality of rows parallel along a length of the drive plate. A side wall of the plurality of nail cavities are preferably offset from a lengthwise axis of the drive plate by a positive or negative acute angle A. Each thumb nail is preferably sloped on a top and a bottom by acute angle B. Some rows of the media engagement thumb nails are all positively sloped and other rows of the media engagement thumb nails are negatively sloped. The plurality of media engagement thumb nails are attached to the drive plate with welding or any other suitable attachment method. The drive plate is bent into a cylindrical shape, after welding the media engagement thumb nails to the drive plate. The opposing ends of the drive plate are attached to each other to form the drive cylinder with welding or any other suitable method.

An inner perimeter of the drive wheel is sized to receive an outer perimeter of the drive disc. The drive disc includes a bolt circle for attachment to a drive hub of a tree harvester (not shown). The drive disc is attached to the drive wheel in substantially a middle of a width thereof with welding or any other suitable method. An inner perimeter of the drive wheel is sized to receive an outer perimeter of the plurality of reinforcement rings. One of the plurality of reinforcement rings is attached to the drive wheel substantially equidistant between the drive disc and a first end of the drive wheel. A second one of the reinforcement rings is attached to the drive wheel, adjacent the first end of the drive wheel. The plurality reinforcement plates are attached to an inside perimeter of the drive wheel between the drive disc and the second end of the drive wheel. A third one of the plurality of reinforcement rings is attached, adjacent a second end of the drive wheel.

Accordingly, it is an object of the present invention to provide a feed direction of a tree trunk retained between feed rollers in a tree processing device to be reversed, and retaining traction and holding properties.

BRIEF DESCRIPTION OF THE DRAWINGS

FIG. 5 is a top view of a drive plate of a bi-directional rotation feed roller prior to being bent into a cylinder in accordance with the present invention.

FIG. 6 is an end view of a drive plate after being bent into a drive cylinder of a bi-directional rotation feed roller in accordance with the present invention.

FIG. 7 is a perspective view of a thumb nail of a bi-directional rotation feed roller in accordance with the present invention.

FIG. 8 is a side view of a thumb nail of a bi-directional rotation feed roller in accordance with the present invention.

DETAILED DESCRIPTION OF THE PREFERRED EMBODIMENTS

Figure 1:
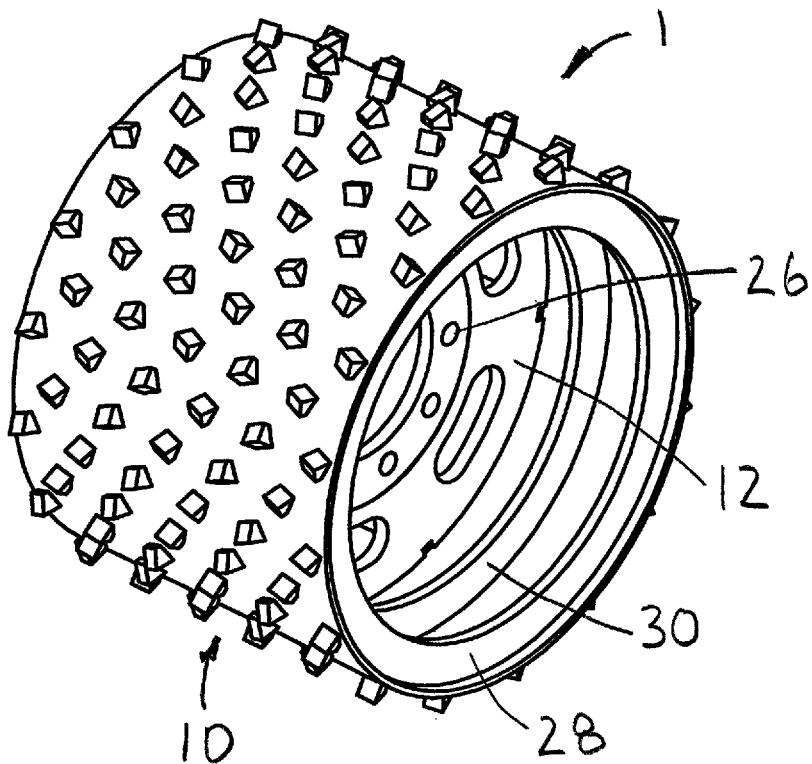
FIG. 1 is a front perspective view of a bi-directional rotation feed roller in accordance with the present invention.
Figure 2:
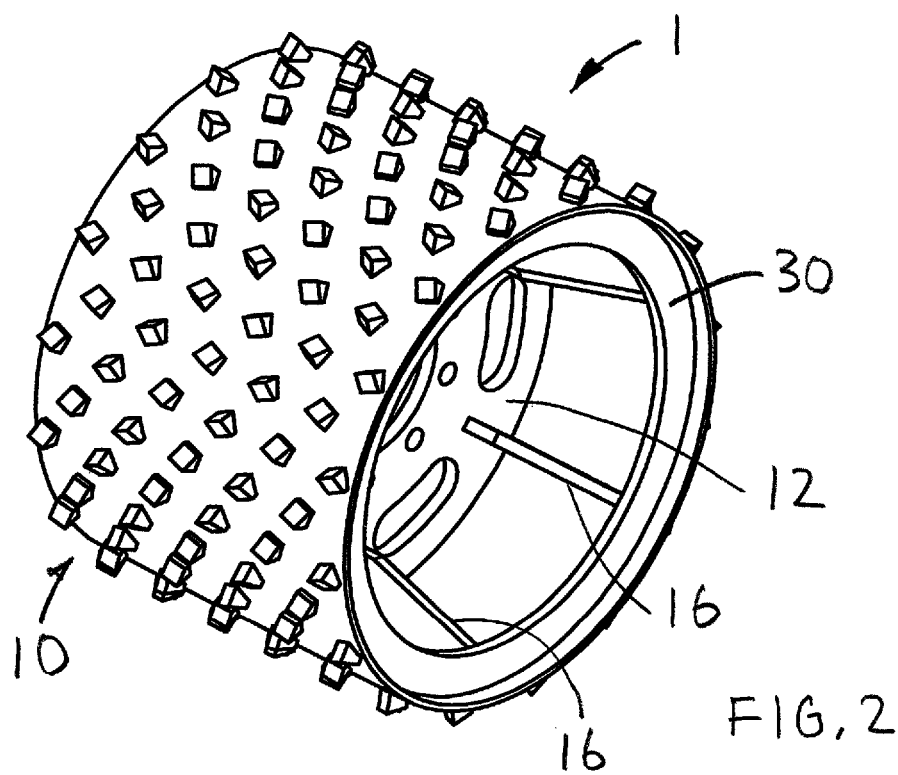
FIG. 2 is a rear perspective view of a bi-directional rotation feed roller in accordance with the present invention.
Figure 3:
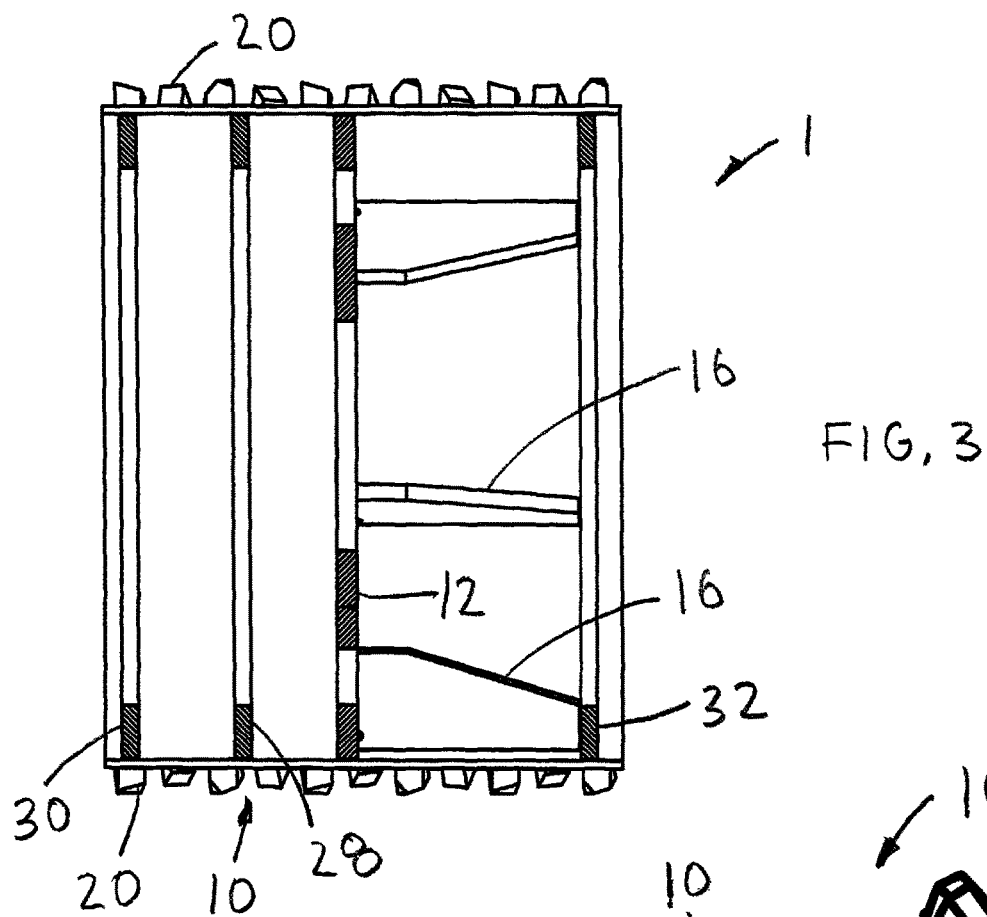
FIG. 3 is a cross sectional view of a bi-directional rotation feed roller in accordance with the present invention.
Figure 4:
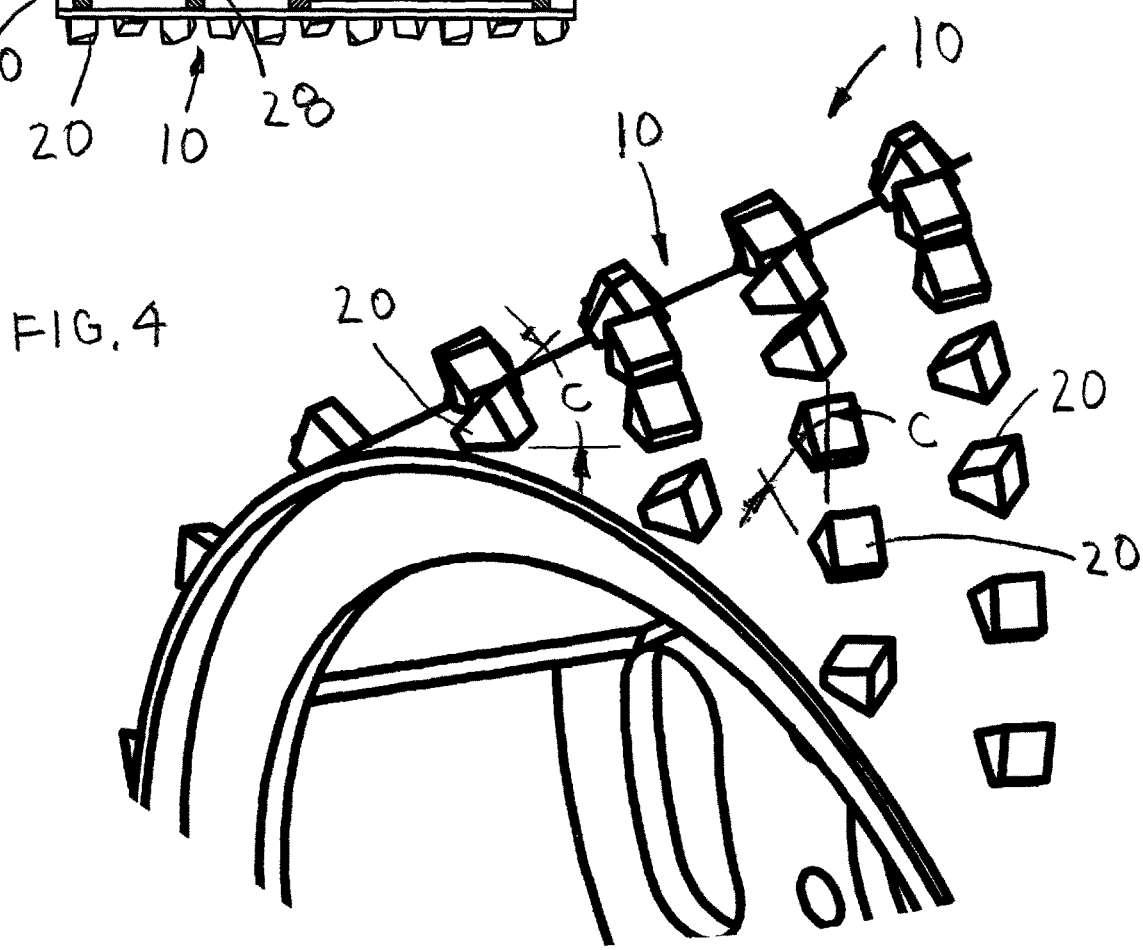
FIG. 4 is a partially enlarged perspective view of drive wheel of a bi-directional rotation feed roller illustrating slopes of a plurality of media engagement thumb nails in accordance with the present invention.

With reference now to the drawings, and particularly to FIG. 1, there is shown a front perspective view of a bi-directional rotation feed roller 1. With reference to FIGS. 2-4, a bi-directional rotation feed roller 1 preferably includes a drive wheel 10, a drive disc 12, a plurality of reinforcement rings 28, 30, 32 and a plurality of reinforcement plates 16. With reference to FIGS. 5-8, the drive wheel 10 includes a drive plate 18 and a plurality of media engagement thumb nails (drive wedges) 20. The specific design of the media engagement thumb nail 20 is to provide tractive engagement with media to be transported, while minimizing damage to the media and still providing bi-directional motion to the media. The plurality of thumb nails are preferably heat treated to Rockwell 48-52, but other hardness values may also be used.

A plurality of shallow thumb nail cavities 22 are preferably etched in an outside surface of the drive plate 18 to receive a perimeter of the plurality of media engagement thumb nails 20. The plurality of thumb nail cavities 22 have a preferable depth of 0.02 inches, but other depths could also be used. The plurality of thumb nail cavities 22 are preferably arranged in a plurality of rows, parallel to a lengthwise axis 24 of the drive plate 18. A side wall of the plurality of nail cavities are preferably offset from the lengthwise axis 24 of the drive plate 18 by a positive acute angle A or negative acute angle −A. Satisfactory bi-directional rotation feed roller 1 performance has been found when the value of angle A is 20 degrees. However, other angle values may also be used. Each thumb nail 20 preferably starts as a cube and is preferably sloped on a top and a bottom by acute angle B to form a substantial triangular prism. Each thumb nail 20 has at least one inclined surface 21 and a rectangular grip face 34. Opposing sides of each thumb nail 20 are flat and perpendicular to an outside surface of said drive cylinder 19. A sloped surface is created if the inclined surface 21 faces upward or is attached to the drive plate 18. Satisfactory bi-directional rotation feed roller 1 performance has been found when the value of angle B is 20 degrees, but other angle values may also be used.

With reference to FIG. 4, some rows of the plurality of media engagement thumb nails 20 are all positively sloped and other rows of the media engagement thumb nails 20 are negatively sloped with angle C. Angle C is equal to 90 degrees minus angle B multiplied by two. The plurality of media engagement thumb nails 20 are attached to the drive plate 18 with welding or any other suitable attachment method. Preferably, the drive plate 18 is bent into a cylindrical shape to form a drive cylinder 19, after welding the media engagement thumb nails 20 to the drive plate 18. The opposing ends of the drive plate 18 are attached to each other to form the drive wheel 10 with welding or any other suitable method. The sloped surface of some of the plurality of media engagement thumb nails 20 face left and the sloped surface of a remainder of the plurality of media engagement thumb nails 20 face right relative to a front view of the drive wheel 10. An inner perimeter of the drive wheel 10 is sized to receive an outer perimeter of the drive disc 12. The drive disc 12 includes a bolt hole pattern 26 for attachment to a drive hub of a tree harvester (not shown). The drive disc 12 is attached to the drive wheel 10 in substantially a middle of a width thereof with welding or any other suitable method. An inner perimeter of the drive wheel 10 is sized to receive an outer perimeter of the plurality of reinforcement rings 28, 30, 32. One of the plurality of reinforcement rings 28 is attached to the drive wheel 10, substantially equidistant between the drive disc 12 and a first end of the drive wheel 10. A second one of the reinforcement rings 30 is attached to the drive wheel 10, adjacent the first end of the drive wheel 10. The plurality of reinforcement plates 16 are attached to an inside perimeter of the drive wheel 10 between the drive disc 12 and a second end of the drive wheel 10. A third one of the plurality of reinforcement rings 32 is attached, adjacent a second end of the drive wheel 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bi-directional rotation feed roller for tree processing devices comprising:
   a drive cylinder having a width;
   a plurality of media engagement thumb nails are attached to an outside surface of said drive cylinder, each one of said plurality of media engagement thumb nails includes a rectangular grip face; and
   a drive disc is secured to said drive cylinder, wherein said drive disc is capable of being attached to a drive hub of a tree processing device, wherein said plurality of rectangular grip faces engage a portion of the tree.

2. The bi-directional rotation feed roller for tree processing devices of claim 1 wherein:
   a plurality of thumb nail cavities are formed in said outside surface of said drive cylinder to receive said plurality of media engagement thumb nails.

3. The bi-directional rotation feed roller for tree processing devices of claim 1 wherein:
   said drive disc includes a bolt hole pattern.

4. The bi-directional rotation feed roller for tree processing devices of claim 1 wherein:
   a plurality of reinforcement rings are attached to an inner perimeter of said drive cylinder.

5. The bi-directional rotation feed roller for tree processing devices of claim 1 wherein:
   a plurality of reinforcement plates are attached to an inside perimeter of said drive cylinder.

6. A bi-directional rotation feed roller for tree processing devices comprising:
   a drive cylinder having a width;
   a plurality of media engagement thumb nails are attached to an outside surface of said drive cylinder, each one of said plurality of media engagement thumb nails includes a rectangular grip face, said rectangular grip face of some of said plurality of media engagement thumb face forward and some face rearward; and
   a drive disc is secured to said drive cylinder, wherein said drive disc is capable of being attached to a drive hub of a tree harvester, wherein said plurality of rectangular grip faces engage a portion of the tree.

7. The bi-directional rotation feed roller for tree processing devices of claim 6 wherein:
   a plurality of thumb nail cavities are formed in said outside surface of said drive cylinder to receive said plurality of media engagement thumb nails.

8. The bi-directional rotation feed roller for tree processing devices of claim 6 wherein:
   said drive disc includes a bolt hole pattern.

9. The bi-directional rotation feed roller for tree processing devices of claim 6 wherein:
   a plurality of reinforcement rings are attached to an inner perimeter of said drive cylinder.

10. The bi-directional rotation feed roller for tree processing devices of claim 6 wherein:
    a plurality of reinforcement plates are attached to an inside perimeter of said drive cylinder.

11. A bi-directional rotation feed roller for tree processing devices comprising:
    a drive cylinder having a width;
    a plurality of media engagement thumb nails each having at least one inclined surface and a rectangular grip face, a side wall of said plurality of media engagement thumb nails are offset from a lengthwise axis of said drive cylinder by a positive acute angle and a negative acute angle; and
    a drive disc is secured to said drive cylinder, wherein said drive disc is capable of being attached to a drive hub of a tree harvester, wherein said plurality of rectangular grip faces engage a portion of the tree.

12. The bi-directional rotation feed roller for tree processing devices of claim 11 wherein:
    a plurality of thumb nail cavities are formed in said outside surface of said drive cylinder to receive said plurality of media engagement thumb nails.

13. The bi-directional rotation feed roller for tree processing devices of claim 11 wherein:
    said drive disc includes a bolt hole pattern.

14. The bi-directional rotation feed roller for tree processing devices of claim 11 wherein:

a plurality of reinforcement rings are attached to an inner perimeter of said drive cylinder.

15. The bi-directional rotation feed roller for tree processing devices of claim 11 wherein:
a plurality of reinforcement plates are attached to an inside perimeter of said drive cylinder.

16. The bi-directional rotation feed roller for tree processing devices of claim 1 wherein:
opposing sides of each one of said plurality of media engagement thumb nails are flat and perpendicular to an outside surface of said drive cylinder.

17. The bi-directional rotation feed roller for tree processing devices of claim 6 wherein:
opposing sides of each one of said plurality of media engagement thumb nails are flat and perpendicular to an outside surface of said drive cylinder.

18. The bi-directional rotation feed roller for tree processing devices of claim 11 wherein:
opposing sides of each one of said plurality of media engagement thumb nails are flat and perpendicular to an outside surface of said drive cylinder.

* * * * *